INVENTOR.
ROBERT E. BRASIER
BY
ATTORNEY

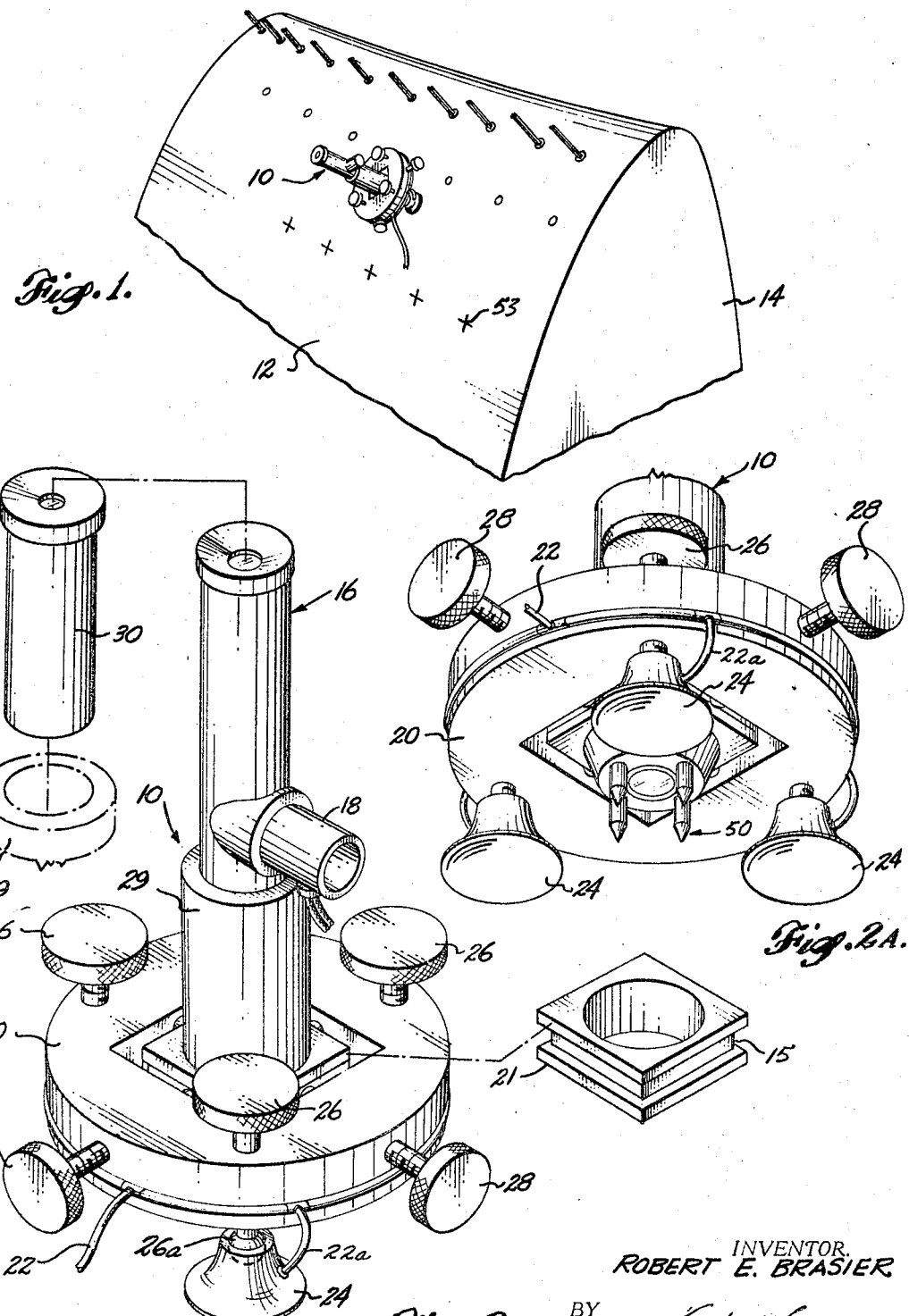

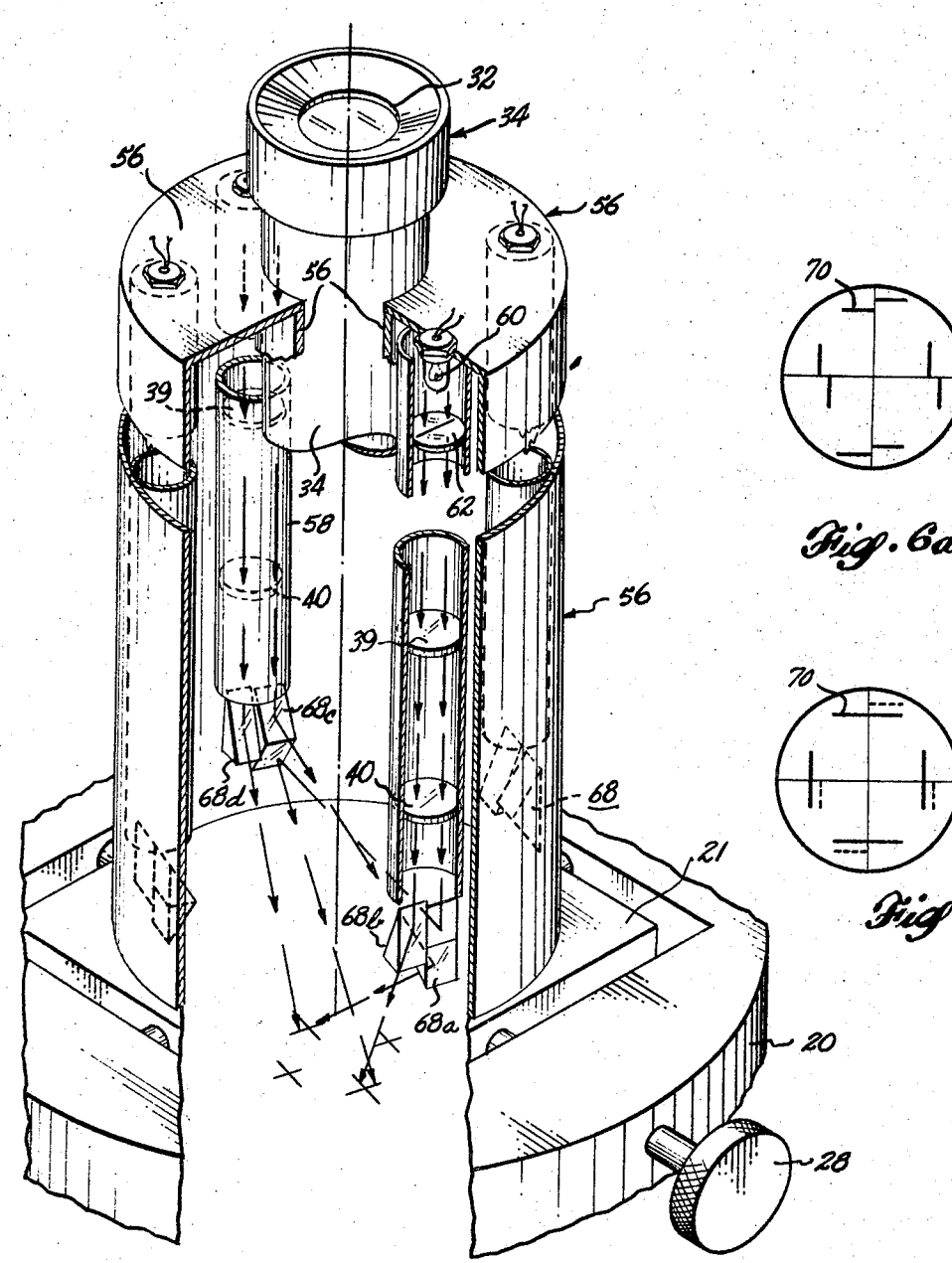

United States Patent Office 3,435,532
Patented Apr. 1, 1969

3,435,532
OPTICAL NORMALIZER
Robert E. Brasier, Seattle, Wash., assignor to The Boeing Company, Seattle, Wash., a corporation of Delaware
Filed July 19, 1965, Ser. No. 473,041
Int. Cl. B27g 23/00
U.S. Cl. 33—185      2 Claims

ABSTRACT OF THE DISCLOSURE

An apparatus for aligning a drill bushing normal to a selected point on a contour surface comprising an adjustable base to be mounted on the contour surface and an illuminated optical alignment telescope mounted in the base and interchangeable with the drill bushing. The telescope has four slidably mounted pins in its lower end for contacting the contour surface and an optical flat actuated by the other ends of the pins. A spherical lens in point contact with the optical flat generates Newton interference rings around the point of contact. By adjusting the base, the Newton interference rings are centered in the field of view of the telescope when the telescope is normal to the contour surface. In another embodiment, means ancillary to the telescope project four pairs of line segments onto the contour surface and the base is adjusted to render respective pairs of line segments continuous in the field of view of the telescope when the telescope is normal to the contour surface.

---

This invention relates to an optical normalizer and more particularly to optical means comprising a compact instrument to align an optical axis of said optical means normal to a compound (varied and uneven) contour surface at a specified point. The instant invention finds particular utility in facilitating drilling operations by orienting a drill bushing normal to a surface at a specified point.

In the past, three basic methods have been used by shop personnel to solve the problem of aligning a drilling jig so that the drill bushing is normal to a surface: (1) alignment by eye, (2) measurements using dial indicators and (3) three point contact drill jig. In the first method, alignment by eye, the drill is positioned using eye sight of the operator until it appears that the drill is normal to the point at which the hole is to be drilled. This method is extremely time consuming where any degree of accuracy is required. The best method so far used is the method whereby measurements are made using a dial indicator. The dial indicator is attached to an adjustable drill jig having three legs which rest on the surface to be drilled. Several measurements are made with the dial indicator from the jig to the surface. When measurements on opposite sides of the drill jig are properly established, the jig is considered normal to the surface. This method has many drawbacks since measurements are made at one inch or greater from the center of the drill jig. For compound surfaces, this results in considerable error. Also, this method requires considerable setup time because of the number of readings that must be made. As to the third method, the three-point contact drill jig has been used successfully on flat and spherical surfaces. However, it is not accurate when used on compound contours because the three points are rather far apart and three points do not accurately represent the contour of a compound contoured surface.

It is therefore a general object of this invention to provide an optical normalizer capable of establishing the normal line to a compound contour surface at any specified point.

Another object of the instant invention is to provide an optical instrument intended and designed to facilitate drilling operations by orienting a drill bushing normal to a surface.

A still further object of the instant invention is to provide an optical normalizer capable of orienting a drill bushing in a drill jig relative to a compound contoured surface which is to be drilled and to so orient the drill bushing that the drill will proceed normal to the surface within tolerance ranges of ¼ of a degree normalcy.

Another object of the instant invention is to provide a compact optical instrument capable of providing and establishing the drill bushing in a drill jig normal to a compound contoured surface at any specified point without the limitations of inaccuracy and detailed and lengthy time setups inherent in systems and instruments used heretofore.

Briefly, a first embodiment of the instant invention provides novel means for controlling the movement of an optical flat in a conventional optical telescope light source optical flat instrument. More broadly speaking, the novel means of the first embodiment is an apparatus for establishing an axis normal to a surface comprising: a support having surface contact means; a lens system including light projection means in combination with said support; and, adjustment means establishing the axis of said lens system normal to a plane formed by each of said surface contact means. More particularly, the surface contact means comprise four contact legs or pins which move independently of one another in contacting a contoured surface. The apparatus is adjusted with respect to the contoured surface by orienting the instrument using the adjustment means as all four contact means are in contact with the surface. The adjustment means establishes the optical axis of the lens system normal to the contoured surface.

Briefly, a second embodiment of this invention comprises means for projecting indicating means (i.e., four sets of split or disjointed lines) upon the compound contoured surface at which a line of normalcy is to be established and then adjusting the projection means with reference to the indicating means. The second embodiment more particularly comprises apparatus for establishing an axis normal to a surface comprising: a support; a light projection system and first lens system in combination with said support; a second lens system including a system of prisms disposed to cooperate with said light projection system and disposed to transmit light from said light projection system and to dispose indicating means upon the surface at a specified point; and, adjustment means to adjust said second lens system and said projection system with reference to the indicating means.

Other objects and many of the attendant advantages of this invention will be readily appreciated as the same become better understood by reference to the following detailed description considered in connection with the accompanying drawings where:

FIGURE 1 is an isometric view showing a model having a contour surface to which the instant invention is attached ready for operation.

FIGURE 2 is an isometric view of the instant invention showing said invention as a compact instrument, as well as showing an isometric of a drill bushing disposed to be placed in the instrument where the telescope portion of the instrument is removably connected.

FIGURE 2A shows an isometric view of the base side of the embodiment in FIGURE 2.

FIGURE 6 is an isometric cutaway of the instrument representing the second embodiment of the instant invention.

FIGURES 6A and 6B are plan views through the eyepiece of the instrument of the second embodiment showing the objective as it would appear on the contour surface during alignment of the optical axis of the instrument of FIGURE 6 normal to a surface.

Figure 2B:
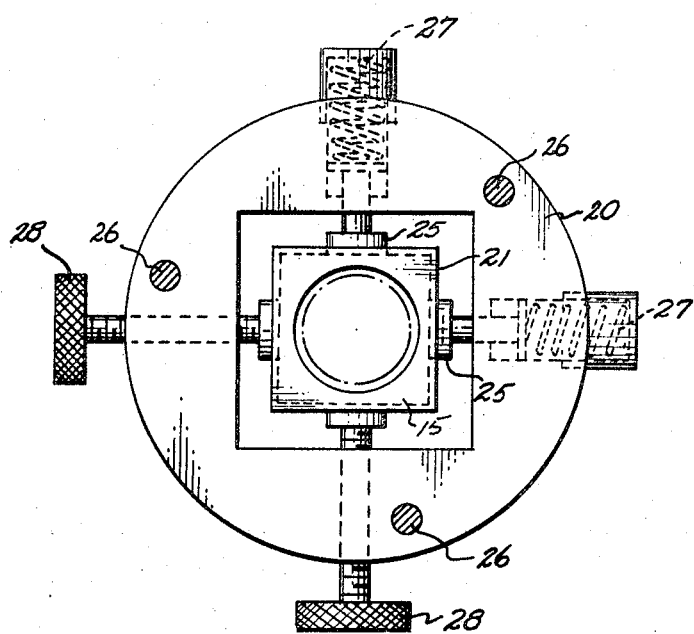
FIGURE 2B is a view detailing the lateral alignment means of the embodiment of FIGURE 2.

With reference to the drawings, like components in the several figures have been designated like reference numerals. Referring to FIGURE 1, apparatus 10 for establishing an axis of a member or tool normal to a surface is shown in fixed position on a contour surface 12 of a model 14. The means by which apparatus 10 attaches to surface 12 along with the general external characteristics of the apparatus 10 can be more readily understood with reference to FIGURE 2.

In FIGURE 2, apparatus 10 is shown to comprise: a platform or support means 20 having suction surface supports 24 (seen also in FIGURE 2A) cooperatively connected with a vacuum manifold 22 by connections 22a; a lens system 16 (e.g., a removable telescope) including lens actuator surface contact means 50 (seen in FIGURE 2A) and light projection means 18; and, lens system 16 angular and lateral adjustment means 26 and 28 respectively (viz., three angular adjustment screws 26 connected by swivel joints 26a to support means 24 and disposed to tiltably adjust lens system 16 about a horizontal axis, and two lateral adjustment screws 28 having opposing bias means 27 as described with reference to FIGURE 2B below). The removable telescope or lens system 16 is disposed by a sliding fit in a bushing 29. Bushing 29 is fixedly connected to sliding platform means 21, having grooves 15, to be described below. Drill bushing 30 is of the same diameter as telescope or lens system 16, and replaces 16 within bushing 29 when the optical axis of 16, which within bushing 29 is coincident with the axis of bushing 29, has been aligned normal to surface 12, as will be taught below, in preparation for drilling operations.

Figure 3:
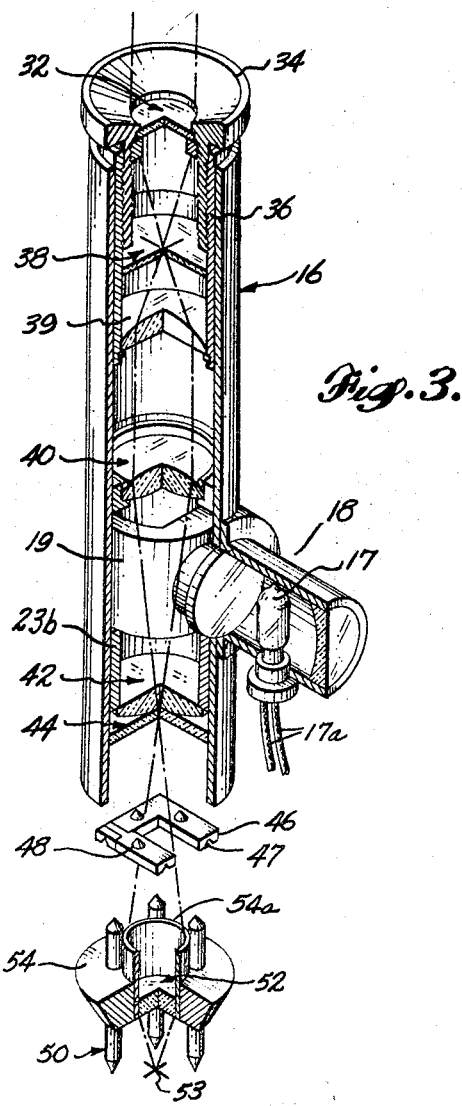
FIGURE 3 shows a detail isometric view of the lens system of the first embodiment of the instant invention.
Figure 3A:
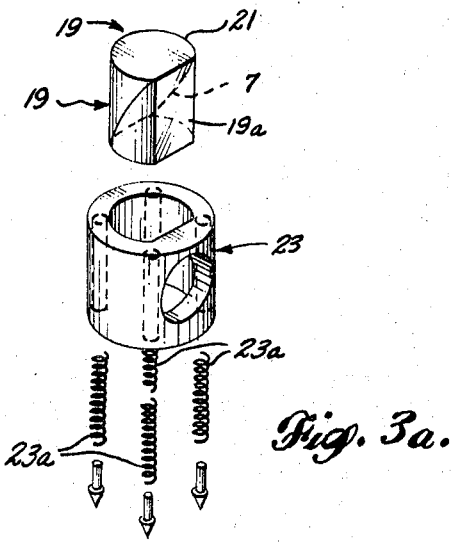
FIGURE 3A is an isometric detail of the light beam splitter portion of the lens system shown in FIGURE 3.

Referring to FIGURE 3, lens system 16 is detailed in its component parts. An eyepiece lens 32 is supported in support means 34 having thread adjustment 36 disposed to mesh with internal threads on the interior surface of telescope 16. Field lens 38 is provided with a reticle cross hair (not shown) for purposes soon to be described. Field lenses 39 and 40 are disposed beneath lens 38 as shown and are retained by any suitable support means on the interior surface of the telescope 16 container wall. The lens system 16 components 39 and 40 provide means for preventing dispersion of light within the lens system 16 and provide for a focusing of the surface objective 53 at the optical axis and coincident with the point of intersection of the cross hairs of lens 38. Light projection means 18 comprises: a monochromatic light source 17 having a voltage source (not shown) providing voltage to light source 17 by means of leads 17a; and, as best seen in FIGURE 3A, light beam splitter means 19, including a prism 19a and light beam splitter housing 23. The housing 23 is disposed to be supported within telescope 16 by springs 23a which bias upon telescope 16 wall supports 23b, as seen in FIGURE 3. Disposed beneath light beam splitter housing 23 in the lens system 16 of FIGURE 3, and biased against support means 23b on the interior wall of telescope 16, is a spherical lens 42 having its convex surface tangent to and biased against an optical flat 44 which is supported on point contacts 48. An objective lens 52 provides magnification of objective markings 53 on surface 12 (not shown). Objective lens 52 is supported by bushing 54a with a sliding fit on the inside surface of means 54 which connects with telescope 16. The tapered shafts 50 are slidably mounted within means 54 and function in a manner described below.

Figure 2C:
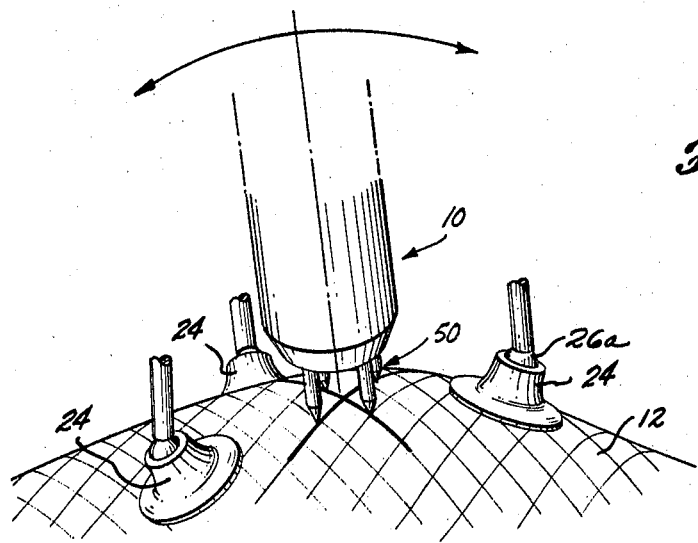
FIGURE 2C is an isometric illustrating angular alignment of the optical axis of the embodiment of FIGURE 2.
Figure 4:
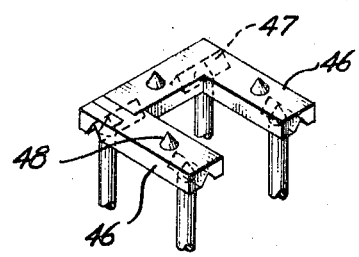
FIGURE 4 shows an isometric view of the four surface contact means as they cooperate with the optical flat actuator and optical flat of FIGURE 3.

Just beneath the optical flat 44 are disposed, in part, the angular adjustment means of the instant invention shown in FIGURE 3 and FIGURE 4 to comprise: linkage means 46 having three optical flat 44 actuating contact points 48. Continuing with reference to FIGURE 4 and FIGURE 3, it is seen that the four tapered shafts or surface contact means 50 are disposed to contact surface 12 as seen in FIGURE 2C. The weight of lens system 16 as it rests on surface 12 is transmitted through surface contact means 50 to points 48, within linkage 46. The shafts 50 move independently of one another so that contact of all four shafts 50 with any contour is possible. Should one or more of the contacts 50 be at a different level of surface 12 than other contacts 50, linkage 46 will be tipped angularly about a horizontal axis, correspondingly. Freedom of movement is allowed linkage 46 by grooves 47 in which the contacts 50 are disposed. This movement will in turn actuate optical flat 44 to also tip about the same horizontal axis due to contact points 48 which move with linkage 46. By adjusting the platform 21 and thereby bushing 29, using adjustments 28 and 26 according to the teachings of this invention discussed below, optical flat 44 can be brought into parallel realtionship with linkage 46 and thereby into parallel relationship to the plane on the surface 12, represented geometrically speaking by the four surface contact means 50. As will be explained in detail below, the optical axis of telescope 16 remains at all times perpendicular to the plane of the platform 21; positioning the optical flat 44 parallel to the plane on surface 12 containing all four points of contact means 50, necessarily places platform 21 parallel to the last-mentioned plane. This establishes the optical axis of telescope 16 perpendicular to the surface 12 at the point desired. To elucidate further, the optical flat 44 is oriented in a plane parallel to the tangent plane of the contour surface 12 at the point of intersection of the optical axis of instrument 10 with the contour surface 12.

Figure 5:
FIGURE 5 is a side view showing a portion of the lens system seen in FIGURE 3.
Figure 5A:
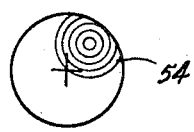
FIGURES 5A and 5B are plan views through the eyepiece of the instant invention showing the objective which is seen on the contour surface.
Figure 5B:
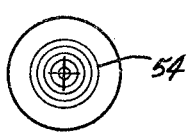

With reference to FIGURES 3-3A and FIGURES 5-5B, the operation of the first embodiment of the instant invention is illustrated. The first embodiment of the instant invention makes use of a light interference phenomenon known as Newton rings. This phenomenon can be observed by laying a slightly convex lens or spherical lens upon a glass plate such as shown in the relationship between lens 42 and the optical flat 44 in FIGURE 3 and FIGURE 5. When lens 42 and plate 44 are arranged as shown in FIGURE 3 and FIGURE 5, and monochromatic light from light source 17 is passed through the lens system 16 of which lens 42 and plate 44 are a part, light is reflected to the observer's eye by beam splitter 19 through eyepiece 32. The point of contact between lens 42 and flat 44 is seen to be surrounded by a series of concentric, alternately bright and dark rings, which appear to become closer together with increasing radius. These rings, Newton rings, are due to the interference of light at the film of air between the glass surfaces of lens 42 and plate 44, which film increases in thickness with increasing distance from the contact point. These Newton rings are shown in FIGURES 5A and 5B relative to the cross hair of lens 38 of the lens system 16 which is aligned coincident with surface objective 53, as taught below, and given reference numeral 54.

In operation, an operator attaches instrument 10 to surface 12 approximately over the point on surface 12 where a perpendicular drill hole is to be made. These points are shown referenced on surface 12 in FIGURE 1 by crossed markings 53. The markings 53 designated in FIGURE 1 and FIGURES 5A and 5B provide the objective which is viewed through instrument 10, telescope 16. Light source 17 provides a narrow band of light to illuminate object 53 on surface 12. Light rays from source 17 are transmitted into beam splitter 19 which comprises a thin film of aluminum 7 separating two prisms 19a as seen in FIGURE 3A. The light rays from source 17 are reflected by beam splitter 19 along the optical axis through objective lens 52. It is desirable that light source 17 be a monochromatic light source since the Newton rings are much more clear with such a light source. As the observer looks through eye lens 32, he attempts to bring the cross hairs of reticle 38 into coincidence with surface markings 53. Before any adjustments of adjustments 28 and 26 are made, let us assume that instrument 10 is resting on surface 12 so that the optical axis of instrument 10 is not aligned normal to surface 12 at a particular surface marking 53. Such a condition will exist and will be visualized through eye lens 32 when the Newton rings are off-center with respect to reticle cross hair 38 as shown in FIGURE 5A. It is to be understood that Newton rings 54 are shown in FIGURE 5A in an illustrative sense only and that the rings may be off-center in any sector of the circle as visualized in FIGURE 5A.

With reference now to FIGURES 2–2C and FIGURES 5A and 5B, by manipulating adjustments 28 and 26, the operator endeavors to adjust the optical axis of telescope 16 by positioning optical flat 44 parallel to the geometric plane containing contacts 50 which now rest on surface 12 as seen in FIGURE 2C. This is accomplished automatically when adjustments 28 and 26 shift platform 21 laterally and the optical flat 44 angularly and bring the Newton rings 54 into a position centered about reticle cross hair 38 as shown in FIGURE 5B. The adjustments 28 and 26 cooperate in the following manner as seen in FIGURE 2B. Opposite each lateral adjustment 28 which is shown as a threaded screw cooperating with internal threads in platform 20, is a bias means 27, exerting a force laterally through shoe 25 against platform 21, in a direction opposite to the force exerted when screw 28 is turned. As seen in FIGURE 2, the platform 21 is provided with grooves 15 in which the shoes 25 are disposed to slide. Thus, lateral displacement of platform 21 is achieved by turning either of the two screws 28 in the direction desired. Since lens system 16 is mounted within bushing 29 to platform 21, the lens system 16 is thereby laterally adjustable.

Angular alignment is achieved by the three vertical screws 26 which are disposed to turn as screws within threaded means in platform 20 and to cooperate with supports 24 by ball swivel connections 26a, as seen in FIGURE 2 and FIGURE 2C. By alternate turns of adjustments 26, the lens system 16 is tiltable about a horizontal axis as shown graphically by arrows in FIGURE 2C as lens system 16 rests upon contacts 50 and surface 12. The proper height of lens system 16 is acquired by manually sliding lens system 16 within bushing 29 (shown in FIGURE 2) until the contacts 50 touch surface 12. Thereafter, angular alignment of optical flat 44 is provided by turning screws 26 which transmits a tiltable force through contacts 50 and 48, as seen in FIGURE 2C and FIGURE 3. Some freedom is allowed in vertical height adjustment of lens system 16, even after contacts 50 have taken their relative displacements due to adjustment of screws 26, due to the four springs 23a seen in FIGURE 3A. That is, as long as the four contacts 50 are contacting the surface 12 the lens system 16 may be relocated laterally by screws 28 without altering the height adjustments 26.

These operations may entail several adjustments in the lateral position through adjustment of screws 28 or a combination of angular and lateral adjustments using 26 and 28. When the Newton rings are centered as shown in FIGURE 5B, optical flat 44 is in parallel position relative to platform 21 because of optical flat 44's relationship relative to contacts 50 as noted above in the discussion relative to FIGURE 3. The optical axis of instrument 10 which is always perpendicular to platform 21 will now be perpendicular to the surface 12 at marking 53. The operator next replaces the telescope system 16 with the drill bushing 30 and the alignment operation is complete and drilling operation ready to begin.

Referring to FIGURES 6–6B, the second embodiment of the instant invention is illustrated, comprising: a support means 20 and platform 21 as set forth in the first embodiment of this invention; a first lens system 16 (removable telescope); a second lens system including more than one lens subsystems 58 and corresponding light projections sources 60; a first lens system 16 adjustment means 28 (viz., lateral adjustments 28) and angular adjustment screws 26 (not shown in FIGURE 6) disposed to cooperate with supports 24 as shown in FIGURE 1 and discussed above; and prism means 68. Lens system 16 comprises removable eyepiece 34 having an objective lens 32 and hairline 32a. Eyepiece 34 is supported in a sliding fit by member 56 which is fixedly mounted on platform 21. In the embodiment of FIGURES 6–6B, eyepiece 34 is not in combination with the lens system 16 of FIGURE 3. However, the drill bushing 30 of FIGURE 1 does replace eyepiece 34 in FIGURE 6 as it did the lens system 16 in FIGURE 1. The member 56 also supports more than one sub-lens systems 58, by supports not shown. Each system 58 comprises a white light projection source 60 having voltage sources not shown, a reticle field lens 62 and two field lenses 39 and 40. Member 56 also supports a plurality of prism systems 68, by supports not shown. As shown by the arrows, in FIGURE 6, the four sub-lens systems 58 cooperate in combination to enable an observer looking through eyepiece 34 to determine when the optical axis of the second embodiment of the instant invention is perpendicular to a surface 12, as will be described below.

In operation, the second embodiment does not incorporate surface contacts 50 as used in the first embodiment but rather provides a series of indicating means or projected lines 70 as seen in FIGURES 6–6B which allow an operator to align the optical axis perpendicular to a surface 12 by means of adjustments 26 and 28. Light from source 60 is projected through each lens 62, in each of the systems 58, having a reticle hair line which projects to surface 12 (not shown) as a line 70. Systems 58 which are oppositely disposed as shown in FIGURE 6 cooperate in a manner described below.

Consider now as an example of operation procedure, prism clusters 68a, b, c, and d, as seen in FIGURE 6, in combination with the FIGURES 6A and 6B. Looking through eyepiece 32 the observer will observe a grouping of lines as shown in FIGURE 6A. The grouping of lines will not necessarily have the pattern as shown in FIGURE 6A, but let us assume that when the instrument 10 is first attached to surface 12 the optical axis is not normal to the surface 12 so that the projected lines 70 have a pattern as shown in FIGURE 6A, after having adjusted the hairline 32a of eyepiece 32 into coincidence with marking 53 on surface 12 (not shown). By properly adjusting adjustments 26 (not shown in FIGURE 6, but adjustment of 26 is the same with respect to supports 24, as shown in FIGURE 2, as discussed above) and 28, the instrument 10 will be moved in such a fashion as discussed with reference to the first embodiment that the projected lines 70 will come to lie co-linear with one another as shown in FIGURE 6B. This co-linear alignment is a direct result of laterally moving platform 21 by screw adjustments 28 and by angularly tilting platform 20 about a horizontal axis by screw adjustments 26 (as seen in FIGURE 2). When the marking 53 and lines 70 are viewed as in FIGURE 6B, the member 56 will have been adjusted from its original position corresponding to the view as seen in FIGURE 6A so that the optical axis of eyepiece 34 is now normal to marking 53 on surface 12. At this time, eyepiece 34 is removed and replaced with drill bushing 30. The drilling operation may now be performed with the drill bit normal to the surface 12 as desired.

Since numerous changes may be made in the above apparatus and different embodiments may be made without departing from the spirit thereof, it is intended therefore that all matters contained in the foregoing description or shown in the accompanying drawings shall be interpreted as illustrative and not in a limiting sense.

I claim:
1. An apparatus for positioning a drill bushing normal to a contour surface comprising:
   (a) a base design to be pivotally mounted on the contour surface;
   (b) a platform slidably disposed in said base generally parallel to the contour surface;
   (c) optical alignment means having a field of view of the contour surface mounted interchangeably in alignment with a drill bushing supporting surface on said platform, the axis of the optical alignment means being generally normal to the contour surface, said optical alignment means comprising:
      (i) a plurality of contact pins of effectively equal length supported in spaced relationship for individual movement substantially in the direction of said axis and having first ends for freely engaging the contour surface;
      (ii) an optical flat freely engaging the second ends of said contact pins;
      (iii) a convex lens in point contact with said optical flat for generating Newton interference rings at the air interface between said lens and said optical flat;
      (iv) optical viewing means for viewing the Newton interference rings and the contour surface; and
   (d) adjustment means for laterally adjusting said platform with respect to said base and for angularly adjusting said base with respect to the contour surface;
whereby the Newton intereference rings are viewed symmetrically with the field of view of the optical alignment means when said optical alignment means is normal to the contour surface.

2. The apparatus as claimed in claim 1 wherein said optical alignment means further includes a substantially monochromatic light source for illuminating the field of view of the contour surface and for intensifying the Newton interference rings at their air interface between said spherical lens and said optical flat.

References Cited

UNITED STATES PATENTS

| 2,577,807 | 12/1951 | Pryor. | |
| 2,861,484 | 11/1958 | Rance | 33—189 X |
| 2,946,246 | 7/1960 | Allan | 33—189 X |
| 3,052,150 | 9/1962 | Jonker. | |
| 3,107,270 | 10/1963 | Hildebrand. | |
| 3,328,885 | 7/1967 | Frindel | 33—46 |

JEWELL H. PEDERSEN, *Primary Examiner.*

A. A. KASHINSKI, *Assistant Examiner.*

U.S. Cl. X.R.

33—46; 356—110